United States Patent
Rastogi et al.

(10) Patent No.: US 9,428,594 B2
(45) Date of Patent: Aug. 30, 2016

(54) HIGH MOLECULAR WEIGHT POLYETHYLENE

(75) Inventors: Sanjay Rastogi, Eindhoven (NL); Sara Ronca, Loughborough (GB); Giuseppe Forte, Loughborough (GB); Hendrik Jacob Tjaden, Deventer (NL)

(73) Assignee: TEIJIN ARAMID B.V., Arnhem (NL)

( * ) Notice: Subject to any disclaimer, the term of this patent is extended or adjusted under 35 U.S.C. 154(b) by 477 days.

(21) Appl. No.: 13/991,402

(22) PCT Filed: Dec. 2, 2011

(86) PCT No.: PCT/EP2011/071581
§ 371 (c)(1),
(2), (4) Date: Jun. 3, 2013

(87) PCT Pub. No.: WO2012/072780
PCT Pub. Date: Jun. 7, 2012

(65) Prior Publication Data
US 2013/0260624 A1   Oct. 3, 2013

(30) Foreign Application Priority Data
Dec. 3, 2010 (EP) .................................... 10193681

(51) Int. Cl.
| *C08F 110/02* | (2006.01) |
| *B29D 7/01* | (2006.01) |
| *C08F 4/52* | (2006.01) |
| *C08J 5/18* | (2006.01) |
| *C08L 23/06* | (2006.01) |
| *B29C 47/00* | (2006.01) |
| *D01D 5/00* | (2006.01) |

(52) U.S. Cl.
CPC .............. *C08F 4/52* (2013.01); *B29C 47/0057* (2013.01); *C08J 5/18* (2013.01); *C08L 23/06* (2013.01); *D01D 5/00* (2013.01); *C08F 110/02* (2013.01); *C08J 2323/06* (2013.01); *C08L 2205/02* (2013.01); *C08L 2207/068* (2013.01); *C08L 2314/06* (2013.01); *Y10T 428/249921* (2015.04); *Y10T 442/10* (2015.04)

(58) Field of Classification Search
CPC ......... C08F 10/02; C08F 110/02; C08J 5/18; C08J 2323/06; C08L 23/06; C08L 2207/068; C08L 2205/02; C08L 2314/06; B29C 47/004; B29C 47/0057; B29C 43/22; B29C 55/005; B29C 55/02; B29K 2023/0683
USPC ...................... 526/160, 170, 348, 348.1, 352
See application file for complete search history.

(56) References Cited

U.S. PATENT DOCUMENTS

| 5,106,558 A | 4/1992 | Kobayashi et al. |
| 5,503,791 A | 4/1996 | Fortuin et al. |
| 2006/0142521 A1 | 6/2006 | Rastogi et al. |
| 2010/0184931 A1* | 7/2010 | Diamond ................ C08F 10/00 526/172 |
| 2013/0066022 A1* | 3/2013 | Robert .................. C08F 110/02 525/333.7 |

FOREIGN PATENT DOCUMENTS

| EP | 0 292 074 A1 | 11/1988 |
| EP | 1 627 719 A1 | 2/2006 |
| JP | A-2008-055901 | 3/2008 |
| WO | WO 97/00766 A1 | 1/1997 |
| WO | WO 01/21668 A1 | 3/2001 |
| WO | WO 2006/107197 A1 | 10/2006 |
| WO | WO 2007/122009 A1 | 11/2007 |
| WO | WO 2007/122010 A2 | 11/2007 |
| WO | WO 2007/122011 A2 | 11/2007 |
| WO | WO 2008/040506 A1 | 4/2008 |
| WO | WO 2008/040509 A2 | 4/2008 |
| WO | WO 2008/040510 A1 | 4/2008 |
| WO | WO 2008/040511 A1 | 4/2008 |
| WO | WO 2009/007045 A1 | 1/2009 |
| WO | WO 2009/109632 A1 | 9/2009 |
| WO | WO 2009/133060 A1 * | 11/2009 |
| WO | WO 2010/007062 A1 | 1/2010 |
| WO | WO 2010/079172 A1 | 7/2010 |
| WO | WO 2010/139720 A1 * | 12/2010 |

OTHER PUBLICATIONS

Talebi et al.; "Molar Mass and Molecular Weight Distribution Determination of UHMWPE Synthesized Using a Living Homogenous Catalyst;" *Macromolecules*; 2010; pp. 2780-2788; vol. 43; American Chemical Society.
Rastogi et al.; "Heterogeneity in polymer melts from melting of polymer crystals;" *Nature Materials*; Aug. 2005; pp. 635-641; vol. 4; Nature Publishing Group.
Lippits, D.R.; "Controlling the melting kinetics of polymers; a route to a new melt state;" *PhD thesis*; Mar. 6, 2007; Eindhoven University of Technology, ISBN 978-90-386-0895-2.
International Search Report dated Jan. 6, 2012 from International Application No. PCT/EP2011/071581.
Written Opinion of the International Searching Authority dated Jan. 6, 2012 from International Application No. PCT/EP2011/071581.

* cited by examiner

*Primary Examiner* — Roberto Rabago
(74) *Attorney, Agent, or Firm* — Oliff PLC

(57) ABSTRACT

The present invention pertains to a polyethylene polymer characterized by the following properties: A number average molecular weight Mn of at least $2.0*10^5$ g/mol, a weight average molecular weight of at least $2.0*10^6$ g/mol, a Mw/Mn ratio of above 6, and a strain hardening slope of below 0.10 N/mm at 135° C. It has been found that a polymer with these properties have be converted through solid state processing into films and fibers with good properties. A solid state processing process, films and fibers, and their use are also claimed.

19 Claims, No Drawings

HIGH MOLECULAR WEIGHT POLYETHYLENE

BACKGROUND

The present invention pertains to a high molecular weight polyethylene which is suitable for the manufacture of films, and fibres with good properties. The invention also pertains to these tapes and fibers, to methods for manufacturing the polyethylene, and to objects manufactured from said tapes and fibers.

It has long been known that polyethylene with a high molecular weight is suitable for manufacturing films and fibers with good properties. A problem, however, has always been the processing of these materials.

In the art, this problem has been solved by the provision of processes involving the use of solutions. U.S. Pat. No. 5,503,791 describes a polyethylene film manufactured by extruding a solution of a polyolefin in a first solvent, followed by cooling, the removal of the solvent and stretching of the film. A disadvantage of the thus obtained film is that it always contains a certain amount of residual solvent, which may detrimentally affect the properties of the film. In general the amount of solvent present in solution of gel-cast films is at least 100 ppm. Further, the recovery of solvent is highly uneconomic.

EP 292 074 describes a method for processing polyolefins with a Mw of more than 400.000, in particular between 500.000 and 10.000.000, a low entanglement density, and a Mw/Mn of less than 10, preferably less than 5 at a temperature below the melting point of the polymer using a process auxiliary agent. The polyolefin is first compressed in the presence of a processing aid, and then subjected to solid state processing. The processing aids mentioned in this reference are polymer solvents. In the Example 17 wt. % of decaline is used.

U.S. Pat. No. 5,106,558 describes a method for the continuous preparation of a polyethylene having high strength and high modulus which comprises the steps of mixing 100 parts by weight of an ultra-high molecular weight polyethylene powder having an intrinsic viscosity of 5-50 dl/g in decalin at 135° C. with 2-50 parts of a liquid organic compound having a boiling point higher than the melting point of polyethylene, feeding the resulting mixture between a pair of rollers, and subjecting the mixture to compression moulding and drawing.

WO 2009/007045 and WO 2010/079172 describe UHMWPE films having a tensile strength of at least 2.0 GPa, a tensile energy to break of at least 30 J/g, a Mw of at least 500 000 gram/mole, and a Mw/Mn ratio of at most 6. A new high molecular weight polyethylene has now been identified which can be processed in a solvent-free manner to form films and fibers with good properties. The polyethylene of the present invention is characterised by the following properties: A number average molecular weight Mn of at least $2.0*10^5$ g/mol, a weight average molecular weight of at least $2.0*10^6$ g/mol, a Mw/Mn ratio of above 6, and a strain hardening slope of below 0.10 N/mm at 135° C.

BRIEF SUMMARY

It should be understood that not all polyethylene having the specified Mw/Mn ratio, Mw and Mn necessarily have the specified strain hardening slope. It has now been found the new type of polyethylene materials (having the specified Mw/Mn ratio, Mw and Mn in combination with the specified strain hardening slope) have good solid-state processability and may be used to manufacture stretched polyethylene materials with good mechanical properties. In particular, these materials have been found to show improved processability and/or mechanical properties as compared to polyethylene materials which do not fulfil all of the specified characteristics.

It will be appreciated that material with a Mw of at least 2 million gram/mol is very high molecular weight indeed. It will also be indicated in the present specification as ultra-high molecular weight polyethylene, or UHMWPE. If such a material would have been available in the past, it would have been regarded as not of any commercial interest, because it would not be processable without using any solvent.

The material according to the invention also has a specified strain hardening slope. It has been found that this parameter ensures the good processability of a material with the specified Mw/Mn ratio, Mw and Mn.

Incidentally, the manufacture of polyethylene with a high molecular weight and a low degree of entanglement has already been described, e.g., in WO01/21668 and US20060142521. However, the Mw/Mn ratio of the materials described in this reference is relatively narrow, e.g., below 6, in particular below 4, more in particular of the order of 1-3.

In contrast, the polymer according to the invention has a broad molar mass distribution. It thus contains a combination of molecules of different lengths. Not wishing to be bound by theory, it is believed that this combination of features makes for the combination of good processability with the good properties of the final product.

DETAILED DESCRIPTION

As indicated above, the polyethylene of the present invention is characterised by the following properties: A number average molecular weight Mn of at least $2.0*10^5$ g/mol, a weight average molecular weight of at least $2.0*10^6$, a Mw/Mn ratio of above 6, and a strain hardening slope of below 0.10 N/mm at 135° C.

The polyethylene may have a Mn of at least $8*10^5$ gram/mole, in particular of at least 1 million gram/mole and more in particular of at least 1.2 million gram/mole.

In one embodiment, the polymer has a Mn in the range of $2.0\text{-}10*10^5$ gram/mole, in combination with a Mw/Mn of at least 10, in particular at least 15.

In a further embodiment, the polymer has a Mn in the range of $2.0\text{-}8*10^5$ gram/mole, in combination with a Mw/Mn of at least 15, in particular at least 20.

In a further embodiment, the polymer has an Mn of at least 800.000 g/mol. The Mn may be at least 1.0 million g/mol, or even at least 1.2 million gram/mol. In this embodiment, the Mw/Mn ratio generally is between 6 and 15, more in particular between 6 and 10.

The Mw/Mn ratio of the polymer according to the invention is more than 6, in particular more than 8. In one embodiment, the Mw/Mn ratio is more than 10, or even more than 12. Higher values, e.g., more than 15 are also possible.

The weight average molecular weight Mw of the polymer according to the invention is more than 2.000.000 g/mol, in particular more than 3.600.000 g/mol, more in particular more than 5 million gram/mole, more in particular more than 10 million gram/mol.

Materials according to the invention may have a monomodal molecular weight distribution or a polymodal molecular weight distribution, e.g., a bimodal molecular weight distribution. In one embodiment, the material according to the invention comprises a first fraction with a Mw of at least 7 million g/mol, in particular at least 10 million gram/mol, more in particular at least 15 million gram/mol, or even at least 20 million gram/mol, or even higher, e.g., at least 25 million gram/mol, in combination with a second fraction with a Mw of at most 1 million gram/mol, in particular at most 0.7 million gram/mol, or at most 0.5 million gram/mol, or even at most 0.25 million gram/mol.

The Mn and Mw may be determined as is described in WO2010/079172. Reference may also be made to S. Talebi et al. in Macromolecules 2010, Vol. 43, pages 2780-2788.

The polymer according to the invention has a strain hardening slope of below 0.10 N/mm at 135° C. Preferably, it also has a strain hardening slope of below 0.12 N/mm at 125° C. The strain hardening slope is determined by subjecting compressed polymer to a drawing step under specific conditions.

The test is carried out as follows: polymer powder is subjected to compaction at a pressure of 200 bar, at 130° C., for 30 minutes to form tensile bars with a thickness of 1 mm, a width of 5 mm and a length of 15 mm. The bars are subjected to drawing at a tensile speed of 100 mm/min at a temperature of 125° C. or 135° C. The drawing temperature is chosen such that no melting of the polymer occurs, as can be checked by DSC in simple heating mode. The bar is drawn from 10 mm to 400 mm. For the tensile test a force cell of 100N is used. The force cell measures force required for the elongation of the sample at the fixed temperature. The force/elongation curve shows a first maximum, which is also known as the yield point. The strain hardening slope is defined as the steepest positive slope in the force/elongation curve after the yield point.

In one embodiment of the present invention, the polymer has a strain hardening slope, determined at 135° C., of below 0.10 N/mm, in particular below 0.06 N/mm, more in particular below 0.03 N/mm. In another embodiment, the polymer has a strain hardening slope, determined at 125° C., of below 0.12 N/mm, in particular below 0.08 N/mm, more in particular below 0.03 N/mm. In a preferred embodiment, the polymer meets the stipulated requirements both at 125° C. and at 135° C.

A low strain hardening slope means that the material has high drawability at low stress. While not wishing to be bound by theory, it is believed that this means in turn that the polymer chains in the solid states contain few entanglements, and that this will enable the manufacture of tapes and fibers with good properties in accordance with the present invention. In other words, a strain hardening slope within this range means that there is little entanglement between the polymer chains. In the present specification, a polyethylene with a strain hardening slope as specified above will therefore also be indicated as a disentangled polyethylene.

In one embodiment of the present invention, a polymer is used with the molar mass and Mw/Mn ratio as described above which can be compressed below its equilibrium melting temperature of 142° C., more in particular within the temperature range of 100-138° C., wherein the thus-obtained film can be drawn below the equilibrium meting temperature by more than 15 times its initial length.

It is preferred for the polyethylene according to the invention to have an elastic shear modulus $G_N^0$ determined directly after melting at 160° C. of at most 1.4 MPa, in particular 1.0 MPa, more in particular at most 0.9 MPa, still more in particular at most 0.8 MPa, more in particular at most 0.7 MPa. The wording "directly after melting" means that the elastic shear modulus is determined as soon as the polymer has melted, in particular within 15 seconds after the polymer has melted. For this polymer melt $G_N^0$ typically increases from 0.6 to 2.0 MPa in one, two, or more hours, depending on the molar mass of the polymer. $G_N^0$ is the elastic shear modulus in the rubbery plateau region. It is related to the average molecular weight between entanglements Me, which in turn is inversely proportional to the entanglement density. In a thermodynamically stable melt having a homogeneous distribution of entanglements, Me can be calculated from $G_N^0$ via the formula $G_N^0 = g_N \rho RT/M_e$, where $g_N$ is a numerical factor set at 1, $\rho$ is the density in g/cm3, R is the gas constant and T is the absolute temperature in K. A low elastic shear modulus directly after melting stands for long stretches of polymer between entanglements, and thus for a low degree of entanglement. The adopted method for the investigation on changes in $G_N^0$ with the entanglements formation is the same as described in publications (Rastogi, S., Lippits, D., Peters, G., Graf, R., Yefeng, Y. and Spiess, H., "Heterogeneity in Polymer Melts from Melting of Polymer Crystals", Nature Materials, 4(8), 1 Aug. 2005, 635-641 and PhD thesis Lippits, D. R., "Controlling the melting kinetics of polymers; a route to a new melt state", Eindhoven University of Technology, dated 6 Mar. 2007, ISBN 978-90-386-0895-2).

It is believed at present to be preferred for the polymer to contain less than 2 wt. % of solid particles, in particular less than 1 wt. %, more in particular less than 0.5 wt %, even more in particular less than 0.1 wt. %, or even less than 0.05 wt. %. It is preferred for the polymer to be manufactured through homogeneous polymerisation, i.e., in the substantial absence of supported catalyst (wherein the word substantial means that limited amounts may be present as long as they do not substantially affect the polymerisation reaction).

The UHMWPE according to the invention has a DSC crystallinity of at least 74%, more in particular at least 80%. In one embodiment, the UHMWPE has a DSC crystallinity of at least 85%, more in particular at least 90%. DSC crystallinity may be determined as described in WO2010/007062, paragraph bridging pages 13 and 14.

In one embodiment, the disentangled UHMWPE has a bulk density which is significantly lower than the bulk density of conventional UWMWPEs. More in particular, the UHMWPE manufactured using the catalyst system of the present invention may have a packing density below 0.25 g/cm$^3$, in particular below 0.18 g/cm$^3$, still more in particular below 0.13 g/cm$^3$. The packing density may be determined in accordance with ASTM-D1895. A fair approximation of this value can be obtained as follows. A sample of UHMWPE powder as synthesised is poured into a measuring beaker of exact 100 ml. After scraping away the surplus of material, the weight of the content of the beaker is determined and the packing density is calculated. The polymer is provided in particulate form, for example in the form of a powder, or in any other suitable particulate form. Suitable particles have a particle size of up to 5000 micron, preferably up to 2000 micron, more in particular up to 1000 micron. The particles preferably have a particle size of at least 1 micron, more in particular at least 10 micron. The particle size may be determined as specified on page 15, lines 6-12 of WO2010/079172.

The polymer according to the invention may be manufactured as follows:

The catalyst used in the present invention is a single-site polymerisation catalyst. The suitable catalyst for the production of UHMWPE should have, in the reaction conditions used, a polymerization rate much higher than the termination rate, where by termination we mean any process that can detach the growing chain from the active metallic centre, so that it terminates the growth of the macromolecular chain.

In one embodiment, ethylene molecules are contacted with a catalytic system under polymerisation conditions for the formation of polyethylene, wherein the catalytic system contains two types of catalyst with different reaction velocities. In one embodiment, the catalyst is combined with two different co-catalysts.

In one embodiment, the catalyst system comprises an activator compound and a metallocene or post-metallocene compound, wherein at least two activator compounds are used in combination.

Suitable metallocene or post-metallocene compounds are known in the art. Examples include: bis(cyclopentadienyl)M R2, bis(indenyl)M R2, dimethylsilylbis(1-indenyl)M R2, bis(2,7-di-tert-butylfluorenyl)-ethan-1,2-diyl)M R2, bis(phenoxy-imine)M R2, bis(trimethylsilyl)benzamidinateM R2, pyridyl-amideM R2, bridged(bi-aromatic)M R2, where M can be any transition metal, more in particular Ti, Zr, Hf, and R can be any halogen or alkyl or aryl group, more in particular chloride, methyl or benzyl.

Activator compounds for olefin polymerisation catalysts are known in the art. Examples of suitable activator compounds include compounds able to alkylate the organometallic complex and ionize it to produce an active olefin polymerization catalyst. Examples include alumoxanes (methyl alumoxane (MAO), propylmethyl alumoxane (PMAO), ethyl alumoxane, diisobutyl alumoxane), alkyl-aluminum compounds (triethylaluminum, diethyl aluminum chloride, trimethylaluminum, triisobutyl aluminum (TIBAL), and the like. Within the present invention, the use of a combination of TIBAL and MAO is considered preferred at this point in time. In general the ratio between the two co-catalyst is in the range of 1-15:1. This also applies to the ratio between TIBAL and MAO. For this embodiment a ratio in the range of 2-8:1 is presently considered preferred.

The polymerisation reaction is carried out at a temperature below the crystallisation temperature of the polymer, so that the polymer crystallises immediately upon formation.

In particular, reaction conditions are selected such that the polymerisation speed is lower than the crystallisation speed. These synthesis conditions force the molecular chains to crystallize immediately upon their formation, leading to a morphology which differs substantially from morphology obtained during crystallisation in solution or in the melt. The crystalline morphology created at the surface of a catalyst will highly depend on the ratio between the crystallization rate and the growth rate of the polymer.

The conditions that need to be controlled for polymerization efficiency and to provide polymer of desired properties include: temperature, pressure and the concentrations of various reactants. Polymerisation conditions suitable to yield the UHMWPE with the specified properties will be discussed below.

The polymerisation reaction is carried out at a temperature in the range of 0-100° C., in particular at a temperature in the range of 0-60° C., more in particular at a temperature in the range of below 25° C. At lower temperatures, the polymerisation rate is lower than the crystallisation rate, which ensures that the material crystallises before it can entangle with polymer chains in the vicinity.

As regards pressure, suitable pressures will also vary according to the reactor and polymerization type. The pressure for liquid phase polymerizations is typically less than 69 bar gauge. Pressure for gas phase polymerization is usually in the range of 10-34 bar gauze, more specifically in the range of 10-20 bar gauge, or 14-34 bar gauge.

The ethylene pressure in the process according to the invention generally varies between 1 and 5 bars, more in particular between 1 and 3 bars.

To obtain a highly disentangled UHMWPE it is important that the polymerisation sites are sufficiently far removed from each other to prevent entangling of the polymer chains during synthesis. This can be done using a single-site catalyst which is dispersed homogenously through the crystallisation medium in low concentrations. More in particular, concentrations less than 1.10-4 mol catalyst per liter. In one embodiment, the catalyst concentration during the polymerisation is in the range of 1.10-9 mol/l and 5.10-4 mol/l, calculated as mole catalyst on liter of diluent, more in particular, from 1*10(−5) mol/l to 1*10(−4) mol/l. Depending on the reaction conditions, a too high catalyst concentration will increase the risk of the formation of entanglements. On the other hand, a too low catalyst concentration may lead to a decreased polymer yield.

Supported single site catalyst may also be used, as long as care is taken that the active sites are sufficiently far removed from each other to prevent substantial entanglement of the polymers during formation. It is considered preferred at present to use homogeneous catalysis, because this is believed to lead to improved process control. Thus, in one embodiment, the process is carried out in the absence of supported catalyst, and the polymer contains less than 0.1 wt. % of particulate material.

The reaction can be carried out in the presence of a suitable diluent or solvent. Suitable diluents are liquid under reaction conditions. They serve, in al., as solvent for the monomer to come in contact with the catalyst. They may also serve as solvent for the cocatalyst. Examples of suitable diluents include, but are not limited to, hydrocarbons such as propane, cyclohexane, isobutane, n-butane, n-pentane, isopentane, neopentane, n-hexane and n-heptane, as well as aromatic solvents as toluene or xylene. Mixtures of solvents may also be used. The solvent should be selected so that it is liquid under reaction conditions. It will be evident to the skilled person which solvents will be liquid under the reaction conditions applied. The use of a mixture of heptane and toluene is considered preferred at this point in time, in particular a mixture containing 25-95% vol. % toluene, in particular 50-95 vol. % toluene, more in particular in the range of 55-80 vol. % toluene. It was found that the use of this particular solvent mixture results in a high polymer yield.

Polymerisation processes are known in the art. The catalysts of the present invention are intended for any olefin polymerization method known in the art, using various types of polymerization reactors. For "polymerization reactor" it is intended any polymerization reactor capable of polymerizing olefin monomers to produce homopolymers or copolymers. The various types of reactors include batch, slurry, gas-phase, solution, high pressure, tubular or autoclave reactors.

High pressure polymerization reactor may comprise an autoclave reactor. Monomer may be entrained in an inert gaseous stream and introduced at one zone of the reactor. Heat and pressure may be employed appropriately to obtain optimal polymerization reaction conditions. Suitable means are utilized for dissipating the exothermic heat of polymerization.

The concentration of various reactants can be controlled to produce resins with certain physical and mechanical properties. The concentrations of monomer, hydrogen, cocatalyst, and electron donors are important in producing these resin properties. Comonomer is used to control product density. Hydrogen is used to control product molecular weight. Co-catalysts can be used to alkylate, scavenge poisons and control molecular weight. The concentration of poisons must be minimized since they will have a deleterious impact on the reactions and product properties. It is within the scope of the common general knowledge of the skilled person to determine the respective parameters.

The polymerisation reaction is generally carried out for a period of 1 minute to 10 hours, depending on polymerisation conditions. If the reaction time is too low, the yield will be insufficient. If the reaction time is too high, little further yield may be obtained, while there is the risk that the polymer chains will entangle. A preferred range for the reaction time may be a period of 30 minutes to 4 hours. It is within the scope of the skilled person to determine the appropriate reaction time. Obviously, the reaction should be continued for a time which is sufficiently long to obtain a material with the Mw and Mn properties, and further properties specified above.

The polyethylene manufactured in the present invention is a homopolymer of ethylene. Minor amounts of (non-ethylene) alpha-olefin may be present in the ethylene homopolymer. Because the presence of other types of monomer will detract from the properties of the final polymer, the amount of this type of monomer is preferably at most 10 mole %, more preferably at most mole %, still more preferably at most 1 mole %, even more preferably at most 0.5 wt. %.

The polyethylene of the present invention is eminently suitable for the manufacture of films and fibers with good properties. Accordingly, the present invention also pertains to a process for manufacturing polyethylene tapes and fibers from the polyethylene described above.

In one embodiment, the ultra-high molecular weight polyethylene described above is converted to films using a solid state film manufacturing process comprising the steps of subjecting the starting ultra-high molecular weight polyethylene to a compacting step and a stretching step under such conditions that at no point during the processing of the polymer its temperature is raised to a value above its melting point. The compacting step is carried out to integrate the polymer particles into a single object, e.g., in the form of a mother sheet. The stretching step is carried out to provide orientation to the polymer and manufacture the final product. The two steps are carried out at a direction perpendicular to each other. It is noted that it is within the scope of the present invention to combine these elements in a single step, or to carry out the process in different steps, each step performing one or more of the compacting and stretching elements. For example, in one embodiment of the process according to the invention, the process comprises the steps of compacting the polymer powder to form a mothersheet, rolling the plate to form rolled mothersheet and subjecting the rolled mothersheet to a stretching step to form a polymer film.

The compacting force applied in the process according to the invention generally is 10-10000 N/cm$^2$, in particular 50-5000 N/cm2, more in particular 100-2000 N/cm$^2$. The density of the material after compacting is generally between 0.8 and 1 kg/dm$^3$, in particular between 0.9 and 1 kg/dm$^3$.

In one embodiment, the compacting and rolling step is carried out at a temperature of at least 1° C. below the unconstrained melting point of the polymer, in particular at least 3° C. below the unconstrained melting point of the polymer, still more in particular at least 5° C. below the unconstrained onset melting point of the polymer. Generally, the compacting step is carried out at a temperature of at most 40° C. below the unconstrained onset melting point of the polymer, in particular at most 30° C. below the unconstrained onset melting point of the polymer, more in particular at most 10° C. In the process of this embodiment the stretching step is generally carried out at a temperature of at least 1° C. below the onset melting point of the polymer under process conditions, in particular at least 3° C. below the onset melting point of the polymer under process conditions, still more in particular at least 5° C. below the onset melting point of the polymer under process conditions. It is noted that it is due to the low value of the elastic shear modulus directly after melting that processing at a value relatively well below the melting temperature of the polymer can be applied.

As the skilled person is aware, the melting point of polymers may depend upon the constraint under which they are put. This means that the melting temperature under process conditions may vary from case to case. It can easily be determined as the temperature at which the stress tension in the process drops sharply. Generally, the stretching step is carried out at a temperature of at most 30° C. below the melting point of the polymer under process conditions, in particular at most 20° C. below the melting point of the polymer under process conditions, more in particular at most 15° C.

The unconstrained melting temperature of the starting polymer is between 138 and 142° C. and can easily be determined by the person skilled in the art. With the values indicated above this allows calculation of the appropriate operating temperature. The unconstrained melting point may be determined via DSC (differential scanning calorimetry) in nitrogen, over a temperature range of +30 to +180° C. and with an increasing temperature rate of 10° C./minute. The maximum of the largest endothermic peak at from 80 to 170° C. is evaluated here as the melting point.

The stretching step in the process according to the invention is carried out to manufacture the polymer film. The stretching step may be carried out in one or more steps in a manner conventional in the art. A suitable manner includes leading the film in one or more steps over a set of rolls both rolling in process direction wherein the second roll rolls faster than the first roll. Stretching can take place, e.g., over a hot plate or in an air circulation oven.

In one embodiment of the present invention the stretching step encompasses at least two individual stretching steps, wherein the first stretching step is carried out at a lower temperature than the second, and optionally further, stretching steps. In one embodiment, the stretching step encompasses at least two individual stretching steps wherein each further stretching step is carried out at a temperature which is higher than the temperature of the preceding stretching step. As will be evident to the skilled person, this method can be carried out in such a manner that individual steps may be identified, e.g., in the form of the films being fed over individual hot plates of a specified temperature. The method can also be carried out in a continuous manner, wherein the film is subjected to a lower temperature in the beginning of the stretching process and to a higher temperature at the end of the stretching process, with a temperature gradient being applied in between. This embodiment can for example be carried out by leading the film over a hot plate which is equipped with temperature zones, wherein the zone at the end of the hot plate nearest to the compaction apparatus has a lower temperature than the zone at the end of the hot plate furthest from the compaction apparatus. In one embodiment, the difference between the lowest temperature applied during the stretching step and the highest temperature applied during the stretching step is at least 3° C., in particular at least 7° C., more in particular at least 10° C. In general, the difference between the lowest temperature applied during the stretching step and the highest temperature applied during the stretching step is at most 30° C., in particular at most 25° C.

Depending on the properties of the polymer, the total stretching ratio of the film can be relatively high. For example, the total stretching ratio may be at least 80, in particular at least 100, more in particular at least 120, in particular at least 140, more in particular at least 160. The total stretching ratio is defined as the area of the cross-section of the compacted mothersheet divided by the cross-section of the drawn film produced from this mothersheet.

It has also been found that using a polymer manufactured in accordance with the present invention as compared to conventional processing of UHMWPE, materials with a strength of at least 2 GPa can be manufactured at higher deformation speeds. The deformation speed is directly related to the production capacity of the equipment. For economical reasons it is important to produce at a deformation rate which is as high as possible without detrimentally affecting the mechanical properties of the film. In particular, it has been found that it is possible to manufacture a material with a strength of at least 2 GPa by a process wherein the stretching step that is required to increase the strength of the product from 1.5 GPa to at least 2 GPa is carried out at a rate of at least 4% per second. In conventional polyethylene processing it is not possible to carry out this stretching step at this rate. While in conventional UHMWPE processing the initial stretching steps, to a strength of, say, 1 or 1.5 GPa may be carried out at a rate of above 4% per second, the final steps, required to increase the strength of the film to a value of 2 GPa or higher, must be carried out at a rate well below 4% per second, as otherwise the film will break. In contrast, in the process according to the invention it has been found that it is possible to stretch intermediate film with a strength of 1.5 GPa at a rate of at least 4% per second, to obtain a material with a strength of at least 2 GPa. For further preferred values of the strength reference is made to what has been stated above. It has been found that the rate applied in this step may be at least 5% per second, at least 7% per second, at least 10% per second, or even at least 15% per second.

The strength of the film is related to the stretching ratio applied. Therefore, this effect can also be expressed as follows. In one embodiment of the invention, the stretching step of the process according to the invention can be carried out in such a manner that the stretching step from a stretching ratio of 80 to a stretching ratio of at least 100, in particular at least 120, more in particular at least 140, still more in particular of at least 160 is carried out at the stretching rate indicated above.

In still a further embodiment, the stretching step of the process according to the invention can be carried out in such a manner that the stretching step from a material with a modulus of 60 GPa to a material with a modulus of at least at least 80 GPa, in particular at least 100 GPa, more in particular at least 120 GPa, at least 140 GPa, or at least 150 GPa is carried out at the rate indicated above.

In will be evident to the skilled person that the intermediate products with a strength of 1.5 GPa, a stretching ratio of 80, and/or a modulus of 60 GPa are used, respectively, as starting point for the calculation of when the high-rate stretching step starts. This does not mean that a separately identifiable stretching step is carried out where the starting material has the specified value for strength, stretching ratio, or modulus. A product with these properties may be formed as intermediate product during a stretching step. The stretching ratio will then be calculated back to a product with the specified starting properties. It is noted that the high stretching rate described above is dependent upon the requirement that all stretching steps, including the high-rate stretching step or steps are carried out at a temperature below the melting point of the polymer under process conditions.

The present invention also pertains to shaped objects comprising the polyethylene according to the invention. Shaped objects are, for example, films, tapes, fibres, filaments, and products which contain these materials, such as ropes, cables, nets, fabrics, and protective appliances such as ballistic resistant moulded articles.

Polyethylene films which may be manufactured using the process described above may have a tensile strength of at least 1.0 GPa, a tensile modulus of at least 40 GPa, and a tensile energy-to-break of at least 15 J/g.

In one embodiment, the tensile strength is at least 1.2 GPa, more in particular at least 1.5 GPa, still more in particular at least 1.8 GPa, even more in particular at least 2.0 GPa, still more in particular at least 2.5 GPa, more in particular at least 3.0 GPa, still more in particular at least 4.0 GPa. Tensile strength is determined in accordance with ASTM D882-00. In another embodiment, the tensile modulus is at least 50 GPa. The modulus is determined in accordance with ASTM D822-00. More in particular, the tensile modulus is at least 80 GPa, more in particular at least 100 GPa, still more in particular at least 120 GPa, even more in particular at least 140 GPa, or at least 150 GPa.

In another embodiment, the tensile energy to break is at least 20 J/g, in particular at least 25 J/g, more in particular at least 30 J/g, even more in particular at least 35 J/g, still more in particular at least 40 J/g, or at least 50 J/g. The tensile energy to break is determined in accordance with ASTM D882-00 using a strain rate of 50%/min. It is calculated by integrating the energy per unit mass under the stress-strain curve.

In one embodiment of the present invention, the films have a 200/110 uniplanar orientation parameter $\Phi$ of at least 3. The 200/110 uniplanar orientation parameter $\Phi$ is defined as the ratio between the 200 and the 110 peak areas in the X-ray diffraction (XRD) pattern of the tape sample as determined in reflection geometry. The 200/110 uniplanar orientation parameter gives information about the extent of orientation of the 200 and 110 crystal planes with respect to the tape surface. For a tape sample with a high 200/110 uniplanar orientation the 200 crystal planes are highly oriented parallel to the tape surface. It has been found that a high uniplanar orientation is generally accompanied by a high tensile strength and high tensile energy to break. It may be preferred for the 200/110 uniplanar orientation parameter $\Phi$ to be at least 4, more in particular at least 5, or at least 7. Higher values, such as values of at least 10 or even at least 15 may be particularly preferred. The theoretical maximum value for this parameter is infinite if the peak area 110 equals zero. High values for the 200/110 uniplanar orientation parameter are often accompanied by high values for the strength and the energy to break. The 200/110 uniplanar orientation parameter $\Phi$ may be determined as is described in WO2010/007062, page 9, line 19, through page 11, line 17.

The shaped object according to the invention may also be a fibre. For the fibres the same preferred ranges apply as have been specified above for the films.

Suitable fibres can be obtained from the films as described above, e.g., via slitting. The process as described above will yield tapes. They can be converted into fibres via methods known in the art, e.g., via slitting. They can also be obtained via a process comprising subjecting a polyethylene tape with a weight average molecular weight of at least 100 000 gram/mole, and a 200/110 uniplanar orientation parameter of at least 3 to a force in the direction of the thickness of the tape over the whole width of the tape. Again, for further elucidation and preferred embodiments as regards the molecular weight, the Mw/Mn ratio, and other properties of the polymer, reference is made to what has been stated above.

In one embodiment of the present invention, the fibres have a 020 uniplanar orientation parameter of at most 55°. The 020 uniplanar orientation parameter gives information about the extent of orientation of the 020 crystal planes with respect to the fiber surface. The 020 uniplanar orientation parameter preferably is at most 45°, more preferably at most 30°. In some embodiments the 020 uniplanar orientation value may be at most 25°. It has been found that fibres which have a 020 uniplanar orientation parameter within the stipulated range have a high strength and a high elongation at break. For further information and a determination method of this parameter, reference is made to page 11, line 19 through page 13, line 17, of WO2010/007062.

In one embodiment, the width of the film is generally at least 5 mm, in particular at least 10 mm, more in particular at least 20 mm, still more in particular at least 40 mm. The width of the film is generally at most 200 mm. The thickness of the film is generally at least 8 microns, in particular at least 10 microns. The thickness of the film is generally at most 150 microns, more in particular at most 100 microns. In one embodiment, films are obtained with a high strength, as described above, in combination with a high linear density. In the present application the linear density is expressed in dtex. This is the weight in grams of 10.000 meters of film. In one embodiment, the film according to the invention has a denier of at least 3000 dtex, in particular at least 5000 dtex, more in particular at least 10000 dtex, even more in particular at least 15000 dtex, or even at least 20000 dtex, in combination with strengths of, as specified above, at least 2.0 GPa, in particular at least 2.5 GPA, more in particular at least 3.0 GPa, still more in particular at least 3.5 GPa, and even more in particular at least 4.

The polyethylene films manufactured from the polyethylene obtained using the catalyst system of the present invention may be used in ballistic applications. This can be done, e.g., in accordance with what has been described in WO2009/109632, WO2009/133060, and WO2010/007062. They can also be used in ballistic materials known in the art, e.g., those described in WO97/00766, EP1627719, WO2007/122009, WO2007/122010, WO2007/122011, WO2006/107197, WO2008/040506, WO2008/040509, WO2008/040510, WO2008/040511.

The present invention will be elucidated by the following examples, without being limited thereto or thereby.

EXAMPLES

Example 1

Polymer Manufacture

A wall-mounted, jacketed Pyrex reactor is equipped with a double plane propeller blade mechanical stirrer, a temperature probe, a gas inlet/outlet and a rubber septum for catalyst injection. The reactor is kept overnight at 125° C., and then the temperature is brought to room temperature while the vessel is purged with three cycles of vacuum/nitrogen.

The solvent upload in the reactor and the polymerization are performed in the following way: 5 L of dried solvent(s) are transferred under inert gas into the vessel and further degassed with nitrogen stream. The temperature is set to 25° C. by mean of a thermostat and when the desired value is reached, the stream of gas is switched from nitrogen to ethylene (ethylene pressure=1.1 bar). After stirring for 30 min, 25 mL of Triisobutylaluminum solution (TibAl, 1.0M in Heptane) are added, followed by a solution of 50 mg of the catalyst in toluene+methylaluminoxane (MAO, AlMAO/Ti=63) to start the polymerization. The reaction is carried on for the required time under vigorous stirring and constant feed of ethylene, controlled by means of a Buchi pressflow gas controller BPC 6002, and then quenched by addition of methanol. The polymer is filtered out, washed with additional methanol and oven dried under vacuum at 40° C. for one night. The results are given in the following table:

| | Solvent | Mn (g/mol) | Mw (g/mol) | Mw/Mn | Strain hardening slope at 135° C. (N/mm) |
|---|---|---|---|---|---|
| Ex 1 | Heptane | 3.1*10$^5$ | 1.50*10$^7$ | 49.6 | <0.10 |
| Ex 2 | Toluene | 9.5*10$^5$ | 5.71*10$^6$ | 6.0 | <0.10 |
| Ex 3 | Toluene:heptane 75:25 (volume ratio) | 5.9*10$^5$ | 6.58*10$^6$ | 11.2 | <0.10 |

Two additional polymers were analyzed and their properties evaluated. The results are shown in the following table:

| | Mn (g/mol) | Mw (g/mol) | Mw/Mn | Strain hardening slope at 135° C. (N/mm) |
|---|---|---|---|---|
| Ex 4 | 8.6*10$^5$ | 1.09*10$^7$ | 12.7 | could not be determined because the material could not be stretched |
| Ex 5 | 15.3*10$^5$ | 9.2*10$^6$ | 6.0 | <0.10 |

The PE of Example 4 is a commercially available PE (HIZEX MILLION 630M PE from Mitsui, Japan). Even though this polymer has a Mn above 0.2 million, Mw above 2 million and Mw/Mn above 6 but it does not have a strain hardening slope of below 0.10 N/mm. In particular, the strain hardening slope of this PE could not be determined because solid state processing of this PE resulted in too brittle materials, which broke when subjected to stretching.

The PE of Example 5 is a PE obtained with a titanium organometallic catalyst supported on silica. This material has a Mn above 0.2 million, Mw above 2 million and a strain hardening slope below 0.10 N/mm but does not have a Mw/Mn above 6.

Example 2

Film Manufacture

The polymer of Example 1 was processed as follows to form a film: 25 gram polyethylene was compacted at an average pressure of 140 bar at a maximum temperature of 130° C. maintained for 10 minutes (cooling of the compacted sheet was carried out while maintaining the pressure at 140 bar). The resulted sheet was 1.4 mm thick, 610 mm long and 30 mm wide. Its density was 0.97 g/cm3. The sheet was pre-heated to 125° C. and subjected to a rolling-stretching step to form a film. Based on the dimensional changes, the ratio of elongation of the integrated rolling/stretching process was 18.4. The surface temperature of the roller-set was 130° C.

The compacted sheet was subjected to a stretching step at 140° C. into several consecutive steps. The total draw ratio, and the properties of the material at that draw ratio are given below.

| draw ratio | Breaking Tenacity N/tex | Mod N/tex | Breaking Energy J/g | Elongation at break % |
|---|---|---|---|---|
| 18.40 | 0.84 | 26.53 | 17.67 | 3.24 |
| 109.80 | 2.89 | 148.97 | 38.49 | 2.31 |
| 162.50 | 3.1 | 164.03 | 38.05 | 2.20 |
| 185.80 | 3.08 | 168.7 | 38.06 | 2.16 |
| 218.40 | 3.2 | 163.91 | 40.63 | 2.31 |
| 241.00 | 3.39 | 175.29 | 43.64 | 2.31 |
| 332.50 | 3.46 | 175.2 | 45.76 | 2.34 |

The total draw ratio was determined by mass per unit length of the film before and after drawing. The mechanical/tensile properties were determined at 20° C. using an Instron Tensile Tester, Model 5566. A crosshead travel rate of 50% of the nominal gauge length of the specimen was applied. Tensile strength (Breaking Tenacity) was determined from the Breaking Force per unit linear density at a gauge length of 100 mm. The Real Modulus was determined via testing several sample lengths and extrapolation towards infinite sample length. The modulus is the segment modulus determined by taking the slope of stress-strain curve obtained during deformation of the tape for the segment between 0.3 N/tex and 0.4 N/tex. Since linear densities were determined in tex, the Breaking Tenacity, and Modulus (segment 0.3-0.4 N/tex) were determined in N/tex and subsequently converted in GPa by using the density.

It can be seen that the material of Example 1 allows the manufacture of a polymer with good properties.

The polymer of Example 4 was compressed at a temperature of 122° C. for 30 minutes under a pressure of 200 bar. The sheet obtained therefrom was pre-heated and rolled with a calander at 120° C. to a total draw ratio of 2.4. The rolled sheet was brittle and could not be subjected to subsequent stretching without breaking. The properties for this material were not measured because the rolled sheet could not be processed further under solid state conditions.

The polymer of Example 5 was compressed at a temperature of 124° C. and 140 bar for 7 minutes. The compressed sheets were pre-heated to 124° C. and rolled with a calander at 124° C. The rolled sheet was stretched at 142° C. because stretching could not be achieved at a lower temperature. The properties of the stretched material are listed in the following table:

| draw ratio | Breaking Tenacity N/tex | Mod N/tex | Breaking Energy J/g | Elongation at break % |
|---|---|---|---|---|
| 157 | 2.05 | 145 | 19.9 | 2.00 |

The properties of the stretched material obtained with the PE of Example 5 are lower than those of the stretched materials obtained with the PE of Example 1. As observed with the PE of Example 1, the properties of stretched materials may be improved by stretching to a higher draw ratio. The properties of the materials obtained with the PE of Example 1 are better than those obtained with the PE of Example 5 even when stretched to a lower draw ratio (e.g. compare the material stretched to a draw ratio of 109.1 of Example 1 with the material of Example 5 stretched to a draw ratio of 157). This is a clear indicator of the superiority of the products obtained with the PE of Example 1.

As can be seen from the above the polyethylene of Example 1 (which has all the characteristics of the polyethylene of the invention) has improved processability when compared to the polyethylene of Examples 4 and 5 (which lack at least one of the characteristics of the polyethylene according to the invention). Also stretched materials obtained from the polyethylene according to the invention (Example 1) have improved properties when compared to the products outside of the invention (Examples 4 and 5). In particular, the polyethylene of Example 4 could not be subjected to solid-state processing to obtain materials from which the strain hardening slope or mechanical properties could be measured.

The invention claimed is:

1. A polyethylene film or fiber comprising a polyethylene polymer, wherein
   the film or fiber have a tensile strength of at least 1.0 GPa, a tensile modulus of at least 40 GPa, and a tensile energy-to-break of at least 15 J/g, and
   the polyethylene polymer has a number average molecular weight Mn of at least $2.0*10^5$ g/mol, a weight average molecular weight Mw of at least $2.0*10^6$ g/mol, a Mw/Mn ratio of at least 10, and a strain hardening slope of below 0.10 N/mm at 135° C.

2. The polyethylene film or fiber according to claim 1, wherein the polymer has a Mn in the range of $2.0\text{-}10*10^5$ gram/mole.

3. The polyethylene film or fiber according to claim 1, wherein the polymer has a Mn in the range of $2.0\text{-}8*10^5$ gram/mole, in combination with a Mw/Mn of at least 15.

4. The polyethylene film or fiber according to claim 1, wherein the polymer has an Mn of at least 800,000 g/mol and a Mw/Mn ratio between 10 and 15.

5. The polyethylene film or fiber according to claim 1, wherein the weight average molecular weight Mw of the polymer is more than 2,000,000 g/mol.

6. The polyethylene film or fiber according to claim 1, wherein the polymer comprises a first fraction with a Mw of at least 7 million g/mol in combination with a second fraction with a Mw of at most 1 million g/mol.

7. The polyethylene film or fiber according to claim 1, wherein the polymer has an elastic shear modulus determined directly after melting at 160° C. of at most 1.4 MPa.

8. The polyethylene film or fiber according to claim 1, wherein the polyethylene polymer is obtained by contacting ethylene molecules with a catalytic system under polymerization conditions for the formation of polyethylene, wherein the catalytic system contains two types of catalysts with different reaction velocities, or a catalyst is combined with two different co-catalysts.

9. The polyethylene film or fiber according to claim 8, wherein the catalyst system comprises an activator compound and a metallocene or post-metallocene compound, wherein at least two activator compounds are used in combination.

10. A method for manufacturing the polyethylene polymer films according to claim 1, wherein the polyethylene polymer is subjected to a compacting step and a stretching step under such conditions that at no point during the processing of the polymer is a temperature of the polymer raised to a value above a melting point of the polymer.

11. A method for manufacturing the polyethylene polymer fibers according to claim 1, wherein the polyethylene polymer is subjected to a compacting step and a stretching step under such conditions that at no point during the processing of the polymer is a temperature of the polymer raised to a value above a melting point of the polymer, to form a film, and the film is converted into fibers.

12. The polyethylene film or fiber according to claim 1, wherein the film has a 200/110 uniplanar orientation parameter φ of at least 3 and the fiber has a 020 uniplanar orientation parameter of at most 55°.

13. A rope, cable, net, fabric, or protective appliance comprising the polyethylene film or fiber according to claim 1.

14. The polyethylene film or fiber according to claim 1, wherein the polymer has a Mn in the range of $2.0\text{-}10*10^5$ gram/mole, in combination with a Mw/Mn ratio of at least 15.

15. The polyethylene film or fiber according to claim 1, wherein the polymer has a Mn in the range of $2.0\text{-}8*10^5$ gram/mole, in combination with a Mw/Mn ratio of at least 20.

16. The polyethylene film or fiber according to claim 4, wherein the polymer has an Mn of at least 1 million g/mol and a Mw/Mn ratio between 10 and 15.

17. The polyethylene film or fiber according to claim 16, wherein the polymer has an Mn of at least 1.2 million gram/mol and a Mw/Mn ratio between 10 and 15.

18. The polyethylene film or fiber according to claim 5, wherein the weight average molecular weight Mw of the polymer is more than 3,600,000 g/mol.

19. The polyethylene film or fiber according to claim 1, wherein the Mw/Mn ratio is above 10.

* * * * *